US007664465B2

(12) United States Patent
Shen et al.

(10) Patent No.: US 7,664,465 B2
(45) Date of Patent: Feb. 16, 2010

(54) ROBUST COEXISTENCE SERVICE FOR MITIGATING WIRELESS NETWORK INTERFERENCE

(75) Inventors: Hui Shen, Issaquah, WA (US); Jiandong Ruan, Sammamish, WA (US); Francis Duong, Bellevue, WA (US); Victoria Poncini, Renton, WA (US); Poovanpilli G. Madhavan, Bellevue, WA (US); Abhishek Abhishek, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 805 days.

(21) Appl. No.: 11/267,458

(22) Filed: Nov. 4, 2005

(65) Prior Publication Data
US 2007/0105501 A1    May 10, 2007

(51) Int. Cl.
*H04B 1/00* (2006.01)
(52) U.S. Cl. ............... 455/63.1; 455/67.13; 455/67.11; 455/434; 455/226.1; 455/296; 455/450; 455/41.2; 370/252; 370/338; 370/346
(58) Field of Classification Search ............... 455/67.13, 455/67.11, 420, 63.1, 434, 41.2, 450, 452.1, 455/296, 63.4, 226.1; 370/252, 338, 465, 370/331; 375/346
See application file for complete search history.

(56) References Cited

U.S. PATENT DOCUMENTS

| | | | |
|---|---|---|---|
| 3,976,981 A | 8/1976 | Bowden | |
| 5,787,131 A * | 7/1998 | Bottomley | 375/347 |
| 5,796,788 A * | 8/1998 | Bottomley | 375/341 |
| 5,802,076 A * | 9/1998 | Weigand et al. | 714/747 |
| 5,822,372 A * | 10/1998 | Emami | 375/260 |
| 6,473,410 B1 | 10/2002 | Sakoda | |
| 6,560,463 B1 * | 5/2003 | Santhoff | 455/522 |
| 6,628,626 B1 | 9/2003 | Norgaard | |
| 6,836,673 B1 * | 12/2004 | Trott | 455/562.1 |
| 6,842,621 B2 | 1/2005 | Labun | |

(Continued)

FOREIGN PATENT DOCUMENTS

EP    1065897    1/2001

(Continued)

OTHER PUBLICATIONS

Office Action dated Mar. 7, 2007 cited in related U.S. Appl. No. 11/004,600.

(Continued)

*Primary Examiner*—Marceau Milord
(74) *Attorney, Agent, or Firm*—Workman Nydegger

(57) ABSTRACT

Described is a determination of whether interference in a wireless network has achieved a threshold level that adversely impacts communication bandwidth. If so, action is taken to mitigate the effects of the interference and thereby improve the bandwidth. The action that is taken may be in the form of at least one mitigation solution, including mitigating by packet fragmentation, mitigating by changing the wireless network's current operating frequency, mitigating by changing a power level, mitigating by transmit dodging, and/or mitigating by pre-selecting at least one transmission criterion based on an observed pattern. A framework is provided to coordinate mitigation of interference-related problems, and includes an interferer decision mechanism that receives RF interference related-data and evaluates the interference data against a threshold. Mitigation is employed when the threshold is achieved on the current operating frequency.

19 Claims, 7 Drawing Sheets

U.S. PATENT DOCUMENTS

| | | | |
|---|---|---|---|
| 6,894,985 B2 | 5/2005 | Billhartz | |
| 6,999,438 B2 | 2/2006 | Nounin | |
| 7,027,827 B2 | 4/2006 | Bonta | |
| 7,035,593 B2 * | 4/2006 | Miller et al. | 455/67.11 |
| 7,035,670 B2 | 4/2006 | Kikuma | |
| 7,072,582 B2 * | 7/2006 | Stevens | 398/38 |
| 7,075,906 B2 * | 7/2006 | Douglas et al. | 370/328 |
| 7,079,812 B2 * | 7/2006 | Miller et al. | 455/63.1 |
| 7,079,847 B2 | 7/2006 | Blair | |
| 7,116,943 B2 * | 10/2006 | Sugar et al. | 455/67.11 |
| 7,127,250 B2 * | 10/2006 | Gallagher et al. | 455/436 |
| 7,167,708 B2 | 1/2007 | Backes | |
| 7,187,925 B2 * | 3/2007 | Abhishek et al. | 455/426.1 |
| 7,254,372 B2 | 8/2007 | Jansuz | |
| 7,263,333 B2 * | 8/2007 | Roberts | 455/67.13 |
| 7,269,151 B2 * | 9/2007 | Diener et al. | 370/329 |
| 7,283,492 B2 | 10/2007 | Malladi | |
| 7,292,656 B2 * | 11/2007 | Kloper et al. | 375/340 |
| 7,308,263 B2 * | 12/2007 | Gallagher et al. | 455/439 |
| 7,339,947 B2 * | 3/2008 | Hammel et al. | 370/458 |
| 7,424,269 B2 * | 9/2008 | Trainin et al. | 455/67.13 |
| 7,440,728 B2 * | 10/2008 | Abhishek et al. | 455/41.2 |
| 7,463,592 B2 * | 12/2008 | Poncini et al. | 370/252 |
| 2003/0125019 A1 | 7/2003 | Bajikar | |
| 2004/0001530 A1 | 1/2004 | Lyle | |
| 2004/0054774 A1 | 3/2004 | Barber | |
| 2004/0077355 A1 | 4/2004 | Kernik | |
| 2004/0077356 A1 | 4/2004 | Kernik | |
| 2004/0085896 A1 | 5/2004 | Banerjea | |
| 2004/0137849 A1 | 7/2004 | Kloper | |
| 2004/0147223 A1 | 7/2004 | Cho | |
| 2004/0203461 A1 | 10/2004 | Hay | |
| 2004/0203474 A1 | 10/2004 | Miller | |
| 2004/0203737 A1 | 10/2004 | Myhre | |
| 2004/0203800 A1 | 10/2004 | Myhre | |
| 2004/0203815 A1 | 10/2004 | Shoemake | |
| 2004/0240525 A1 | 12/2004 | Karabinis | |
| 2004/0259589 A1 | 12/2004 | Bahl et al. | |
| 2005/0003827 A1 | 1/2005 | Whelan | |
| 2005/0021621 A1 | 1/2005 | Welch | |
| 2005/0070294 A1 | 3/2005 | Lyle | |
| 2005/0100119 A1 | 5/2005 | Husted | |
| 2005/0111383 A1 | 5/2005 | Grob | |
| 2005/0122999 A1 | 6/2005 | Scherzer | |
| 2005/0143123 A1 | 6/2005 | Black | |
| 2005/0181823 A1 | 8/2005 | Haartsen | |
| 2005/0207395 A1 | 9/2005 | Mohammed | |
| 2006/0121853 A1 | 6/2006 | Madhavan | |
| 2006/0121854 A1 | 6/2006 | Abhishek | |
| 2006/0217067 A1 | 9/2006 | Helbig | |
| 2006/0251012 A1 | 11/2006 | Hara | |

FOREIGN PATENT DOCUMENTS

| | | |
|---|---|---|
| EP | 1411685 | 4/2004 |
| WO | WO03001742 A1 | 1/2003 |
| WO | 2004-077724 | 10/2004 |

OTHER PUBLICATIONS

Office Action dated Aug. 23, 2007 cited in related U.S. Appl. No. 11/004,600.

Office Action dated Feb. 8, 2008 cited in related U.S. Appl. No. 11/004,600.

Office Action dated Feb. 5, 2008 cited in related U.S. Appl. No. 11/004,288.

Office Action dated Apr. 28, 2008 cited in related U.S. Appl. No. 11/004,428.

Office Action dated Dec. 23, 2008 cited in U.S. Appl. No. 11/004,288.

Notice of Allowance dated Aug. 13, 2008 cited in U.S. Appl. No. 11/004,600.

Notice of Allowance dated Sep. 23, 2008 cited in U.S. Appl. No. 11/004,428.

On the Union of WPAN in Mobile Computers and Hand-Held Devices http://www.intel.com/technology/itj/2003/volume07issue03/art03/union/p07_solutions.htm.

* cited by examiner

ROBUST COEXISTENCE SERVICE FOR MITIGATING WIRELESS NETWORK INTERFERENCE

BACKGROUND

Wireless local area networks (WLANs) are proliferating in both home and enterprises. Such wireless networks may be used for web browsing, file transferring, audiovisual streaming, sending and receiving messages, and other purposes. As wireless connectivity spreads, the likelihood of radio frequency (RF) activity from other bands and overlaying bands used in wireless networking bands increases for any given location, resulting in interference for a greater percentage of wireless network users.

Further, because wireless networks operate in unlicensed bands in the 2.4 GHz and 5 GHz regions of the RF spectrum, many other RF devices transmit information (or noise) on these frequencies as well, causing interference to the WLAN communication. Examples of various sources and types of interference seen by a wireless network may include microwave ovens, which cause slow periodic interference; cordless phones, which cause interference of a type referred to as "slow hopper;" a Bluetooth headset (causing fast hopper interference); digital spread spectrum (DSS) cordless phones, which cause constant custom waveform interference; and wireless surveillance cameras, which cause constant standard waveform interference. In addition, other nearby WLANs operating on the same channel, such as that of a neighbor, can cause interference.

As is understood, RF interference in wireless networking results in an effective reduction of available data rates and/or range, causing poor user experience. While a technically knowledgeable user may be able to mitigate a regularly occurring interference problem by reconfiguring networking devices to operate on another channel, many of the sources of interference transmit intermittently, whereby even if one problem was solved by changing to another channel, another problem that occurs intermittently might arise, which is more difficult to detect and resolve.

Further, while some application programs using WLAN communications may not be perceptibly affected by interference, such as web browsing, other programs may be highly sensitive to interference, such as application programs directed towards the streaming of content that occupies large bandwidth. In the case of audio-visual content streaming, this effect can be dramatic in that the stream may break. There are no known electrical means to dynamically fix such problems.

SUMMARY

This Summary is provided to introduce a selection of concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the present invention are directed towards determining whether interference in a wireless network has achieved a threshold level that adversely impacts communication bandwidth on the current operating frequency. If so, action is taken to mitigate the effects of the interference and thereby improve the bandwidth. The action that is taken may be in the form of at least one mitigation solution, including mitigating by packet fragmentation, mitigating by changing the wireless network's current operating frequency, mitigating by changing a power level, mitigating by transmit dodging, and/or mitigating by pre-selecting at least one transmission criterion based on an observed pattern.

In one example implementation, a framework is provided to coordinate mitigation of interference-related problems. The framework includes an interferer decision mechanism that receives RF interference related-data and evaluates the interference data against a threshold. Mitigation is employed when the threshold is achieved on the current operating frequency. To this end, a mitigation mechanism is triggered by the interferer decision mechanism when the threshold is achieved, and the mitigation mechanism determines at least one mitigation solution to mitigate the interference-related problems. A feedback mechanism receives mitigation solution-related information from the mitigation mechanism and provides the information to networking components for dynamically controlling wireless network communications components to adjust for the interference.

In this manner, by evaluating a level of interference in the wireless network against one or more criteria, a determination is made as to whether mitigation is needed to increase bandwidth. When mitigation is needed, at least one mitigation solution is implemented to improve the bandwidth.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
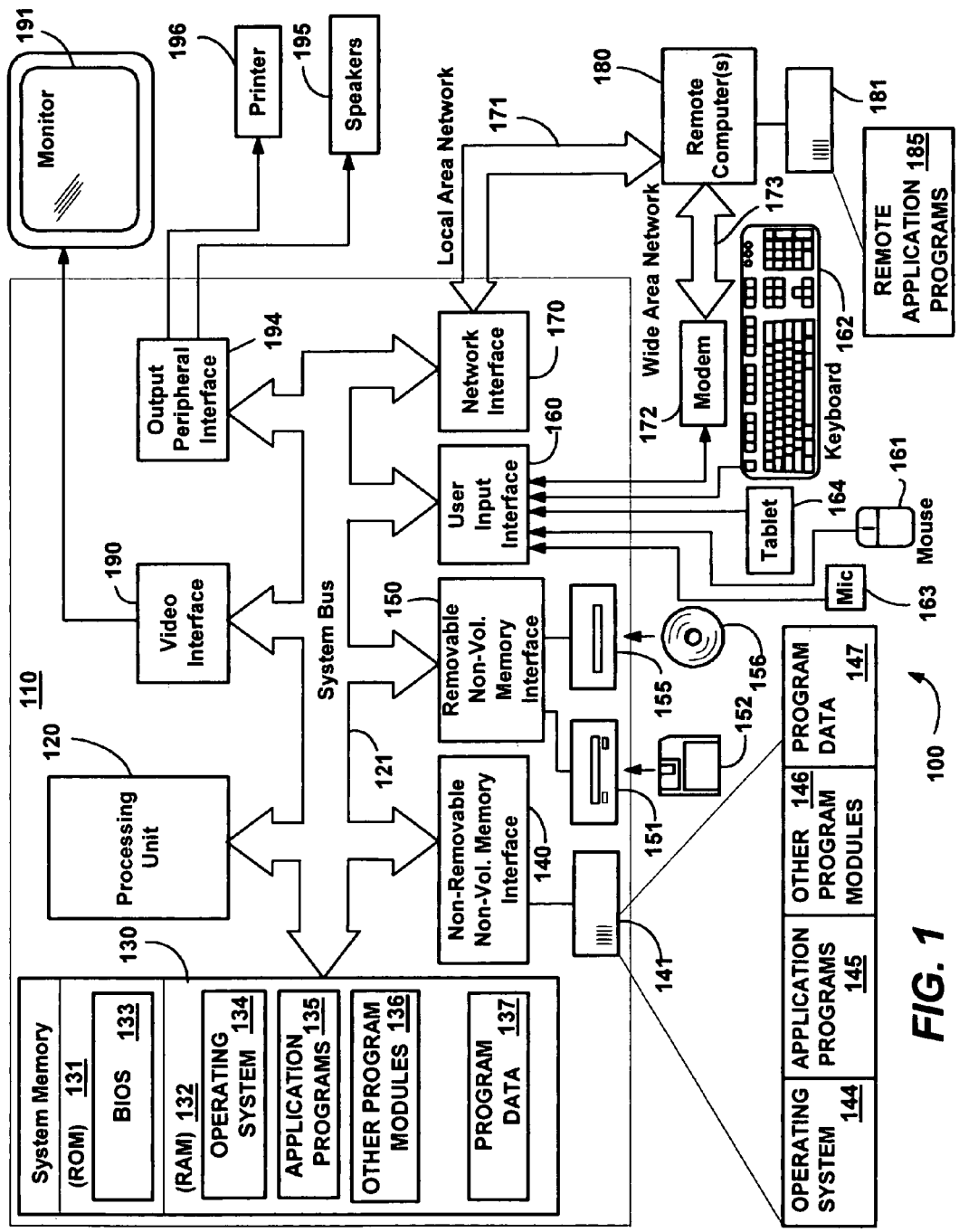
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Mitigating Wireless Network Interference

Various aspects of the technology described herein are directed towards mitigating problems caused by interference in the portion of the RF spectrum that is used for wireless network communications, particularly communications in wireless local area networks (WLANs). To mitigate such problems, interference processing modules such as RF sensors, RF signature analysis systems and self-correcting software modules are available, e.g., in the form of various third party hardware and software components; such components are continually being refined and further developed. U.S. patent application Ser. No. 11/004,288 entitled "Extensible Framework for Mitigating Interference Problems in Wireless Networking," filed Dec. 3, 2004 and assigned to the assignee of the present invention, describes a Robust Coexistence Service (RCS) that among other things, interconnects such software components to mitigate the effects of RF interference with WLAN communications. Additional concurrently filed patent applications assigned to the same assignee describe other mechanisms that help mitigate wireless networking interference problems, including U.S. patent application Ser. No. 11/004,428, which is generally directed to a protocol for communicating interference-related information, and U.S. patent application Ser. No. 11/004,600, which is generally directed to using another channel (e.g., in the licensed band) for mitigating interference that occurs in the unlicensed band.

As will be understood, numerous ways to implement the present invention are feasible, and only some of the alternatives are described herein. For example, the present invention is primarily described below with reference to components separated into modules for programming convenience, system stability, robustness and so forth. However, as can be readily appreciated, such modularization is not required, and at least some of the modules may be combined, and/or any given module may be further separated into more modules.

Further, the framework allows for mitigation based on locally-sensed interference data and remotely-sensed interference data; however the invention provides benefits regardless of where the data is sensed. Moreover, the framework is primarily described herein as being run on a computer system, but alternatively may be adopted by hardware manufacturers for integration into an access point device, wireless bridge, and so forth. Thus, the present invention is not limited to any particular hardware or software components, frameworks, protocols and/or other mechanisms for mitigating interference, but rather may be implemented in a variety of ways. As such, any of the examples mentioned herein are non-limiting, and the present invention may be used various ways that provide benefits and advantages in computing in general.

Figure 2:
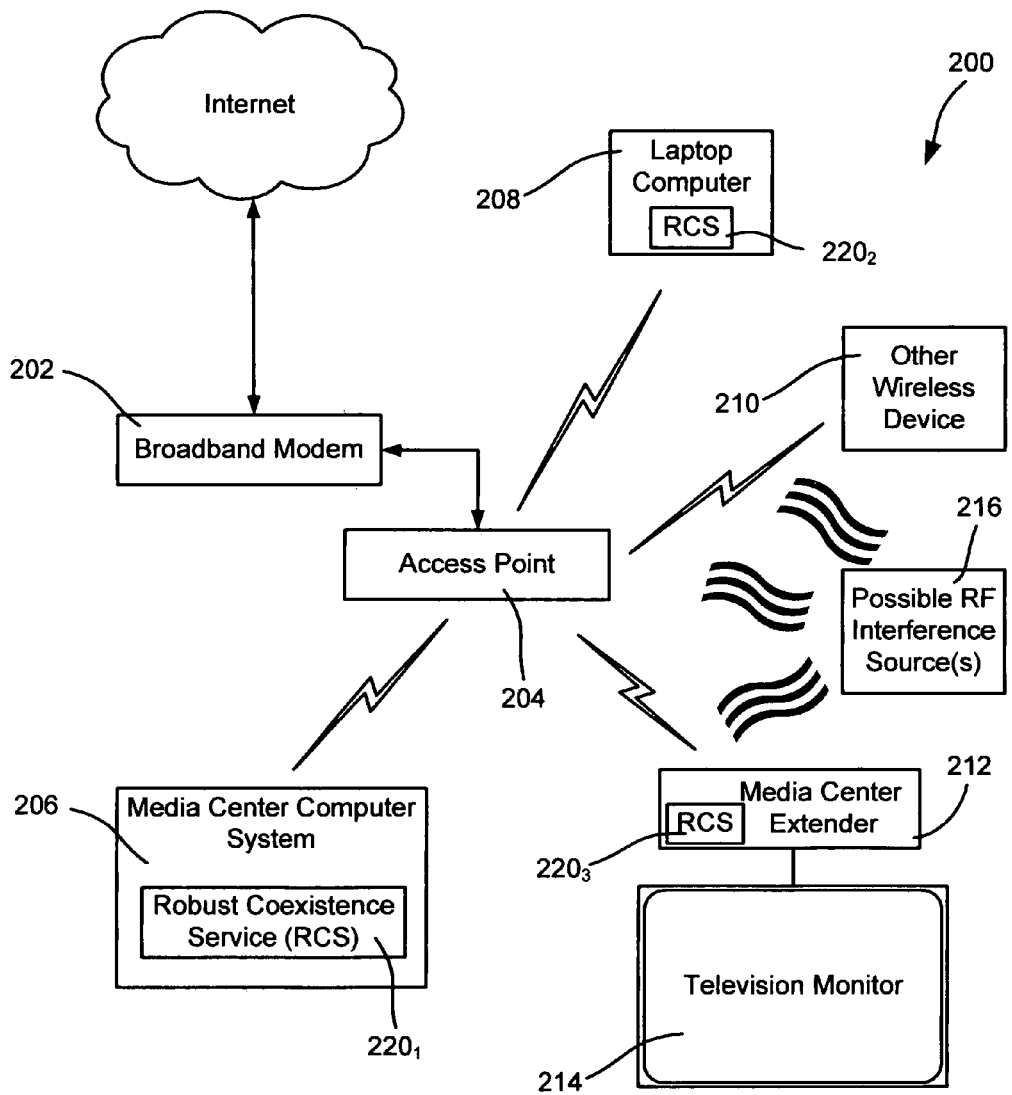
FIG. 2 is a block diagram generally representing an example wireless network including components running instances of a robust coexistence service that may mitigate problems caused by interference in the network.

Turning to FIG. 2 of the drawings, there is shown an example wireless network 200 containing wireless devices such as may be found in a home networking environment, but may, of course be used in other environments, and also may be connected to a wired network device or devices. In the example network 200 of FIG. 2, a broadband modem 202 such as a cable modem or DSL modem receives and sends Internet data within the network 200. A wireless access point (wireless router) 204, ordinarily connected by a wired connection (directly or indirectly) to the broadband modem 202, couples the other wireless devices to the broadband router 202 and to one another. As is known, the wireless access point may be built into the same housing as the modem, which can also include connections for wired device coupling.

The other wireless devices represented in FIG. 2 include a media computer system 206, a laptop computer 208, some other wireless device 210 such as a different laptop or desktop computer, and a media center extender 212 (similar to a set-top box) that couples audiovisual signals to a television monitor 214. Note that an alternative media center extender may be directly incorporated into the television monitor. FIG. 2 also shows a representation of one or more possible sources of RF interference 216, which may be essentially anything that generates RF transmissions that can cause interference with wireless network communications, whether intentionally operating in the same frequency range, such as with a cordless telephone, or because of noise that results as a side-effect of operating, such as with a microwave oven. Such noise may be relatively continuous, or may be intermittent.

By way of example, consider that the media center 206 streams audiovisual content via the access point 204 to the media center extender 212. While the audiovisual data is being streamed, one or more of various non-networking RF sources 216, such as a slow hopper (e.g., cordless phone), a fast hopper (e.g., a Bluetooth headset), a slow periodic interferer (e.g., a microwave oven), a constant standard waveform interferer (e.g., a surveillance camera), and/or constant custom waveform (e.g., a digital spread spectrum phone), as well as other co-channel WLANs, may interfere with and thereby constrain the available bandwidth for the audiovisual stream. As can be readily appreciated, the stream may be interrupted or the bandwidth constrained to such an extent that the media center extender 212 exhausts any buffered data, whereby the user experience is that of a frozen, erratic or otherwise incorrect picture and/or sound. Occasional use of the interfering device, such as is typical with telephone usage patterns, is generally unpredictable and can be even more frustrating to the user.

As described below, while the audiovisual stream is on, the robust coexistence service running on one or more of the various nodes provides a mechanism for interference sensing and mitigation. This provides a stable closed-loop system to provide adequate mitigation. Various mitigation mechanisms, described below, along with a mitigation information communication protocol (e.g., described in U.S. patent application Ser. No. 11/004,428) that distributes sufficient mitigation-related information in a timely manner without consuming too much bandwidth, reduce or avoid the effects of the interference.

Some of the wireless devices depicted in FIG. 2 include an instance of the robust coexistence service (RCS), shown in FIG. 2 as RCS instances $220_1$-$220_3$. As described in the aforementioned U.S. patent application Ser. No. 11/004,288, each robust coexistence service (e.g., $220_1$) may provide a mechanism and framework by which the negative effects of RF interference on wireless networking may be dynamically mitigated to an extent, or possibly even eliminated by avoiding the interference, to thereby provide an improved wireless networking experience for users.

Although FIG. 2 is somewhat representative of a home network, it can be readily appreciated that the technology described herein is also directed towards enterprise wireless networks and their environments. For example, the robust coexistence service may include client/server components and thus in a larger network may be implemented in a client-server model, as described in the aforementioned U.S. patent applications.

Figure 3:
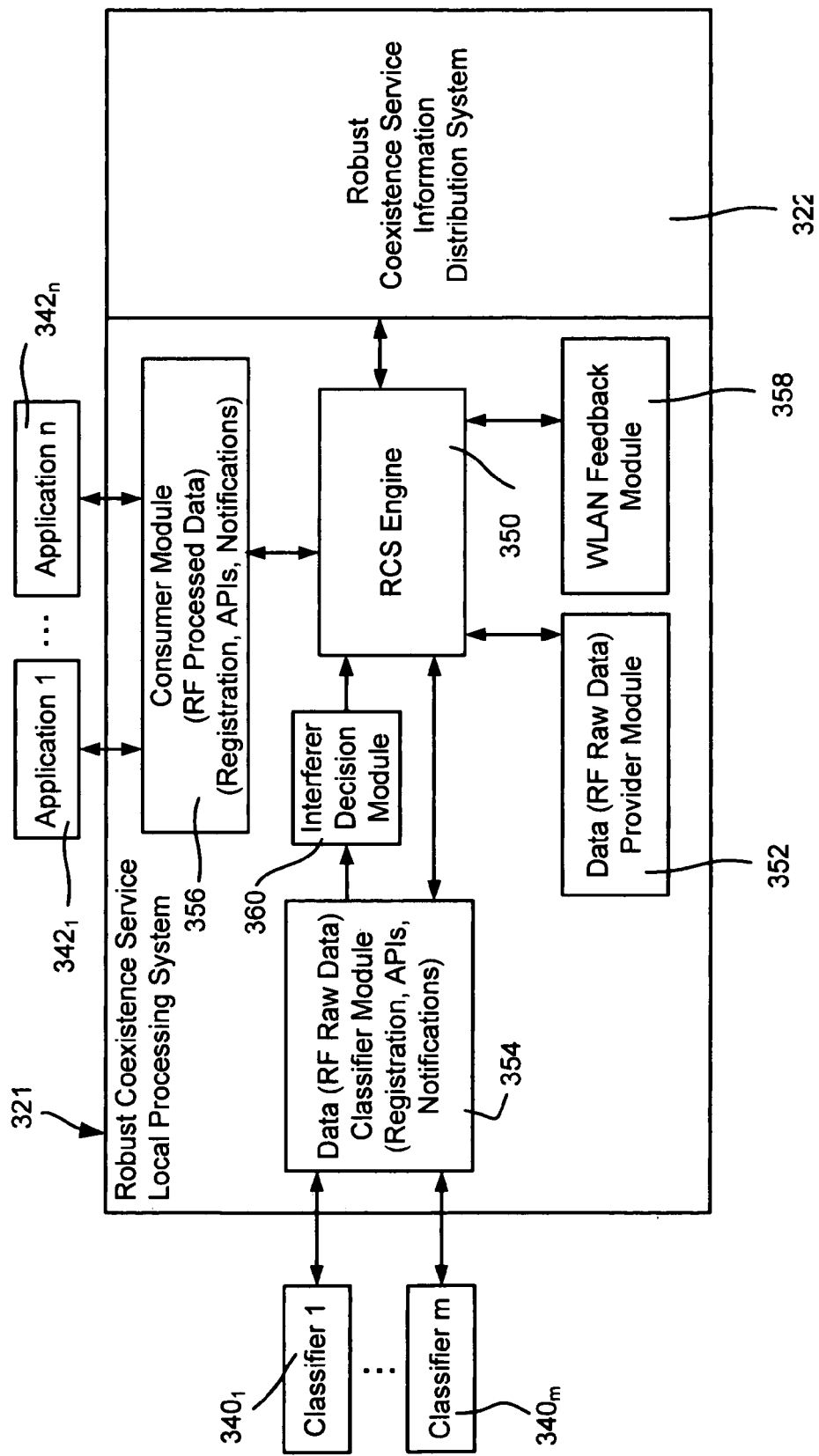
FIG. 3 is a block diagram generally representing components connected to example components of the robust coexistence service.

FIG. 3 shows an example component subsystem of a robust coexistence service, referred to as a local processing system 321, along with the local processing system's internal modules and various other modules and resources to which it connects. In general, the RCS local processing system 321 interconnects and coordinates the operations of various external modules that plug into the robust coexistence service running on a network node, such as a computer system or an access point, in order to develop mitigation data that may be used to dynamically control the wireless networking components in a way that mitigates the problems caused by interference. To this end, the RCS local processing system 321 interconnects external modules that process spectrum data sensed by local spectrum hardware, e.g., stand-alone hardware and/or hardware integrated into a WLAN chipset, and makes the processed information available for mitigation purposes.

Another part of the robust coexistence service, referred to as an RCS information distribution system 322, coordinates the communication of the control information to other remote devices that are running respective instances of the robust coexistence service, along with handling control information sensed at, processed and received from those remote devices. In other words, as exemplified in the aforementioned patent applications, herein incorporated by reference, the RCS information distribution system 322 provides locally-obtained control data for use by any other remote robust coexistence service for interference mitigation purposes on its corresponding remote node, and obtains remotely-sensed control data for use by the local node for interference-related mitigation.

As described in the aforementioned patent applications, in general, RF sensing spectrum hardware located essentially anywhere in the network area provides sensed raw RF data to the local processing system 321. The RCS local processing system 321 provides interfaces to internal modules by which external modules, including classifiers $340_1$-$340_m$ and applications $342_1$-$342_n$, may register with the robust coexistence service 321. As part of registration, the various registering modules identify one or more various types of data that each supports, including data in a predefined, generic format understood by any classifier module, and/or data in a proprietary format (treated as blobs when routed to the corresponding classifier). The ability to use a proprietary format allows customized RF sensors and classifiers to be used in the framework. Data types may be a combination of pre-defined generic data and proprietary data type. A mapping is obtained (e.g., in the RCS engine 350) to relate the provider, classifier, consumer and driver in order to identify how a current set of information is to be processed. Identifiers may be used in routing custom data to the correct classifier, as can an evaluation as to whether at least part of the raw data is in the predefined format, in which event any classifier can consume at least part of the raw data. Alternatively, classifiers may receive and discard data they do not understand.

Within the RCS local processing system 321, an RCS engine 350 provides connectivity among its internal modules 352-358, generally routing data as appropriate. In general, the RCS engine 350 coordinates the activities of the various modules in the service, and also stores classifier data for future use, e.g., in some storage. For example, the storage may preserve time-stamped interference classifier information events that may be used for historical analysis.

Via the layered mechanism described above, a data provider module 352 of the system 321 obtains the raw data sensed by the spectrum sensing hardware along with any raw RF data and other lower MAC (media access controller) and PHY (physical) layer device data. From there, the data provider module 352 transfers the raw data to the RCS engine 350 to be forwarded to an appropriate classifier or classifiers (e.g., based on the respective data type or types for which they have registered) for processing into classified data. In one implementation, the data provider module 352 and the drivers may use identifiers (e.g., OIDs or APIs) to pass the raw RF data for consumption by a corresponding classifier or classifiers. As can be readily appreciated, the use of a driver model provides extensibility, as various spectrum sensors may be connected via a corresponding driver, including new ones as developed.

To route the RF data to an appropriate classifier, the RCS engine 350 forwards the raw data to a data classifier module 354 of the local processing system 321. In general, the classifier module 354 communicates with the registered classifier or classifiers $340_1$-$340_m$, to provide the raw spectrum data thereto and return processed data, referred to as classified data, for further processing. Note that this also provides for extensibility, as new and/or improved classifiers can simply plug-in as they become available.

In turn, the external classifiers $340_1$-$340_m$, which comprise one or more pluggable modules, essentially look at the raw RF data to determine what is happening in the RF environment. To this end, the classifiers $340_1$-$340_m$ process the raw RF data to perform signature analysis and the like, possibly combining the RF data with other network traffic measurements, to identify the data's relevant characteristics and possibly the source of interference (e.g., cordless phone, microwave oven, Bluetooth device and so forth), and supply such classified data for further action.

A consumer module 356 of the local processing system 321 takes the classified data and (via the RCS engine 350) may store it in the storage and/or route the classified data to registered application programs $342_1$-$342_n$, such as for enunciation of the detected interference as well as for higher-level processing to determine how to adapt the program to avoid the interference. To this end, one or more application programs register with the local processing system 321 to use the classified data to take some action, such as to provide a viewable notification or other indication regarding interference (e.g., a diagnostic application may prompt the user about an RF issue, such as "Cordless phone in use"), and/or, to determine a way to mitigate interference-related communication problems to some extent. For example, the classified data can be used by application programs such as an audio/video streaming application program to reduce the image size of an ongoing transmission, thereby transmitting a lesser amount of A/V streaming data. To this end, the application program may use the classified data as a hint for the application program to conduct its own tests to decide a due course of action in adjusting its behavior.

Note that one application program such as a diagnostic program may handle notifications, and another program may devise its own mitigation solution based on the classified data and any test results. Again, because of the plug-in model for application programs, the framework's extensibility characteristics are readily apparent. Also note that it is desirable to have mitigation decisions/actions occur relatively quickly, such as at present, on the order of under 100 milliseconds for audiovisual applications.

In turn, interference mitigation-related information determined by the robust coexistence service may be passed (e.g., via the RCS engine 350) to a feedback module 358, from where it is communicated to the WLAN miniport driver (or the WLAN NIC) for performing dynamic upper-MAC and other adaptations that provide an interference mitigation solution. By way of example, WLAN Feedback module 358 is a suitable decision maker for determining from the classified data and internal WLAN data that interference-related problems may be mitigated. The WLAN miniport driver (or the WLAN NIC) are suitable alternatives for making the decision. Mitigation may be performed by changing the frequency to another channel, changing the rate at which data is sent, changing the timing of sending data (such as to avoid interference that starts and stops in a predictable pattern), and in other ways, including combinations of channel, rate and/or timing solutions, switching to another band, staying on the same channel while employing transmission/noise dodging, employing fragmentation to reduce packet size (smaller packets have lower collision chances compared to larger packets and in case of a collision, the cost of retransmission is less due to smaller size of retransmission), and so forth. Noise dodging refers to solutions such as delaying transmission during sufficiently noisy times, and transmitting during sufficiently quiet times.

The local processing system 321 may remain idle until needed, that is, until some RF interference is sensed. To awaken the local processing system 321 at the correct time, a triggering mechanism may be used, comprising one or more components that monitor the NDIS layer 338 and provide indications of interference. Further, note that the triggering mechanism may not awaken the local processing system 321 to initiate interference processing until some threshold level of interference is achieved.

To this end, one aspect of the technology described herein is directed to deciding whether to respond to sensed interference, and if so, how to mitigate the effect of interference in the case of wireless local area networks. For example, as represented in FIG. 3, an interferer decision module 360 decides if the interference is significant so as to merit action, and if so, the robust coexistence service 321, based on the wireless environmental conditions, determines how available channels are to be rank ordered, and based on this information, what action, such as channel change and/or fragmentation need to be performed to mitigate the interference problems. Note that in an enterprise scenario, the RCS robust coexistence service 321 may be open to an external entity for channel change coordination. Further, note that while the robust coexistence service 321 provides the framework and the information, other mitigation mechanisms actually act on the information, to lessen the negative effect of the mitigation.

Although not necessary to the present invention, the mitigation mechanisms will be described herein via an example in which interferers are far field (seen by essentially any component in the network) and thus mitigation may be initiated by an access point in a basic service set (BSS). Further, the mitigation-related communication may occur on a small unused amount of bandwidth on the current WLAN channel, although the use of another channel for communicating such information is feasible, e.g., as described in the aforementioned U.S. patent application Ser. No. 11/004,600.

A mitigation decision may be made by the interferer decision module 360 by processing the output of a classifier (e.g., $340_1$ of FIG. 3) along with data of an RF sensor before making a decision to initiate mitigation. In general, the interferer decision module 360 decides whether the current non-WLAN interferer does not provide sufficient carrier-to-interference (C/I) ratio for symbol detection, and/or decides whether the current WLAN interferer is a different BSS. Alternatively, a software-based component of the robust coexistence service may use radio strength signal indicator (RSSI), receive (RX) sensitivity threshold and signal-to-noise ratio (SNR) to facilitate the same type of measurements. In essence, such a software-based component is another type of classifier.

For purposes of simplicity, the mitigation solutions described herein will primarily focus on fragmentation (self-action) and channel changing using instantaneous frequency selection (coordinated action among nodes). Note however that any of various mitigation solutions may be performed, including increasing the output power of transmitting nodes, using patterns and historical/profile analysis (such as choosing different ways to mitigate depending on the time of day, and/or whether the day is weekend day or weekday) to pre-select a channel, power, and/or packet size, and transmit/noise dodging techniques.

With respect to fragmentation, the mitigation concept is that smaller fragments have a higher probability of getting through a channel that is subject to RF interference than large packets, although large packets are more efficient when RF interference is not an issue. With respect to instantaneous frequency selection (IFS), IFS is similar to dynamic frequency selection (DFS) and automatic frequency selection (AFS), but provides a channel change within a significantly shorter time interval relative to DFS or AFS.

To decide whether a current non-WLAN interferer does not provide sufficient C/I ratio for symbol detection, the interferer decision module 360 computes whether a "worst case" modulation will still work within specification, e.g., 54 Mbps will work if the interferer is 17 dB below the signal level. For 802.11b the following table, (in which SNR is the signal to noise ratio), is used as an example:

| Data Rate | SNR Required |
|---|---|
| 1 Mbps | 2 dB |
| 2 Mbps | 5 dB |
| 5.5 Mbps | 7 dB |
| 11 Mbps | 9 dB |
| 802.11a/g: | |
| 6 Mbps | 0 dB |
| 9 Mbps | 1 dB |
| 12 Mbps | 3 dB |
| 18 Mbps | 5 dB |

-continued

| Data Rate | SNR Required |
|---|---|
| 24 Mbps | 8 dB |
| 36 Mbps | 12 dB |
| 48 Mbps | 16 dB |
| 54 Mbps | 17 dB |

Figure 4:
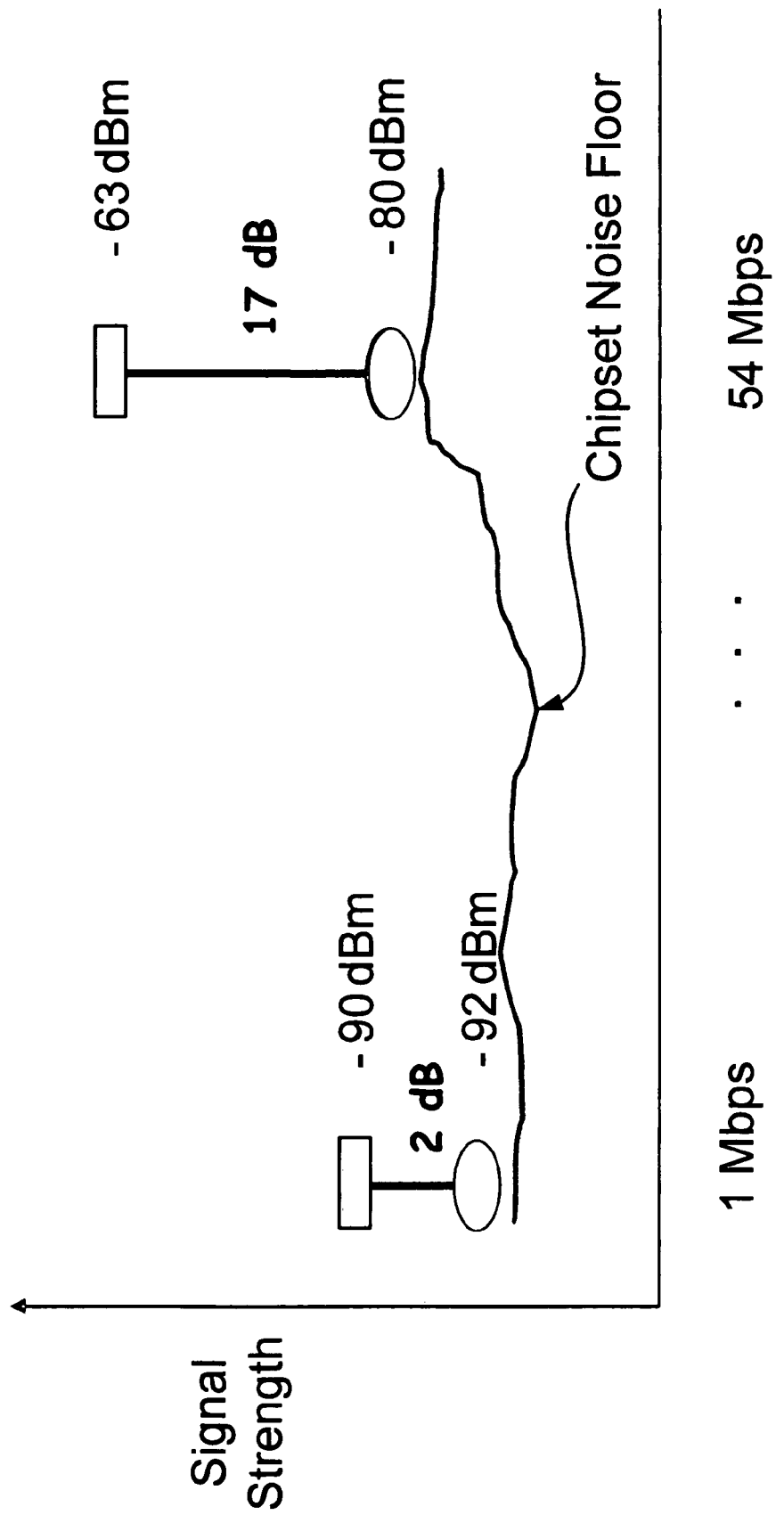
FIG. 4 is a representations of a graph showing an example chipset noise floor in a wireless network device that varies with signal strength and operating frequency.

As represented graphically in FIG. 4 the reception (Rx) sensitivity of the WLAN chipset defines the smallest received signal power that is required for it decode the frame within a specified bit error rate (BER). Therefore, if the interferer is 17 dB or more below the Rx sensitivity, the interferer will have no impact on the performance of the chipset in this example. The decision can be made more selective based on the data rate, and a margin may be added to the SNR.

For a non-802.11 interferer, if the interferer signal strength reported by the classifier is below the chipset noise floor, the interferer decision module will not report the presence of an interferer. In one example implementation, the Rx sensitivity may be obtained by the robust coexistence service 321 from an OID, e.g., OID_DOT11_RECV_SENSITIVITY_LIST. In other example implementations, WLAN hardware vendors may include Rx sensitivity data in the vendor-specific part of the MIB (Management Information Base), read this information via SNMP (Simple Network Management Protocol), and make the signal strength available to the robust coexistence service 321.

For each data rate, the signal-to-noise ratio in the above table is subtracted from its Rx sensitivity. The smallest value obtained is declared as the chipset noise floor, and used for the determination by the interferer decision module 360, irrespective of the actual data rate. Note that it is feasible to consider the data rate, e.g., an application can indicate (e.g., via an API call) a certain required data rate, and the interferer decision module 360 can determine whether interference is sufficient to warrant mitigation based on the that required data rate.

For 802.11 interferers, that is, other WLANs in the same operating channel, a message is sent to the wireless nodes in the serving BSS to stop transmitting, and pass a command to the RF sniffer to sniff the serving channel. If there are any other WLANS, the classifier will report the presence of 802.11 interferer with its usual parameters (including average power). Note that this assumes that wireless nodes in the serving BSS run Native WiFi.

In one example implementation, an OID_802_11_BSSID_LIST provides the BSSs that the node can see, along with a radio signal strength indicator (RSSI) from each of the BSSs. Other mechanisms for obtaining a list of BSS and corresponding RSSI data may be employed. Note that the RSSI for each may be averaged over time to get a representative value. Occasionally, such as periodically (e.g., every 30 seconds), the list is examined, and, for example, a moving average over the last ten measurements or the like for the serving BSS may be computed. The sniffer reported average power of the 802.11 interferer is compared to the averaged RSSI of the serving BSS. If the averaged 802.11 interferer power is 20 dB (or some other chosen value) below the averaged RSSI of the serving BSS, the interferer decision module 360 will not report the presence of an interferer. Note that this is an intrusive method that shuts down the serving BSS before taking sniffer measurements in a timed-locked manner. Alternatively, as described above, software-based classifier may use RSSI, RX sensitivity threshold and SNR to facilitate the same type of measurements.

The following shows an computation for implementing the above example where the RSSI is averaged RSSI at step "n" such as every 30 seconds:

$$RSSIavg(n) = \lambda RSSIavg(n-1) + (1-\lambda)RSSI(n); \text{ where}$$
$$\lambda = 0.9; RSSIavg(0) = RSSI \quad (1)$$

When the interferer decision module 360 reports interference, mitigation is employed, which may include fragmentation, based on the higher probability of smaller fragments getting through a channel that is subject to RF interference than larger packets. The details of the frame size in use may be obtained to help decide on the fragmentation thresholds for mitigation. Note that IEEE 802.11 devices have the option to split one data packet (Mac Service Data Unit, or MSDU) into smaller fragments (Mac Protocol Data Unit, or MPDU) for transmitting. Fragments are transmitted in sequence. The receiver takes the responsibility to reassemble the packets back to the original MSDU. Fragmentation is a self-determined operation decided by the transmitter.

As described above, not only does a shorter packet normally have a higher probability of getting through a channel that is subjected to RF interference than a larger packet, but when transmitting a long packet, the sender needs to retry the entire packet if there is an error. For fragmented packet, the sender only needs to retransmit the fragmentation that has error. Thus fragmentation as a mitigation solution can provide better transmission.

For example, fragmentation as a mitigation solution may be employed with periodical RF noises having a short period. To this end, tome devices transmit regular noise in a timely manner that interference with large 802.11 MPDUs. The period of such noise is relatively short comparing with the MPDU lengths, so that during the "silent" interval of the noise, zero or few long MPDU can be transmitted successfully. In this case, fragmentation is an effective mitigation solution.

Random/intermittent RF noise may be present, such as white noise, interference from other wireless devices and even other 802.11 networks. Smaller-sized fragments have a higher probability to be successfully transmitted, and thus reduce the packet retry and drop rate. Thus, fragmentation can be a good mitigation option.

In contrast, for periodical RF noises with a long period, e.g., when devices transmit regular noises in a timely manner with a relative long period, fragmentation may not provide similar benefits. For example, consider a device such as a microwave oven that sends out noise at 2.4 Ghz with a period of 16 ms, in which approximately half of the period is a noisy interval and the other half is silent interval. During the silent interval (6~8 ms), dozens of 802.11 MPDU can be transmitted. In this situation, fragmentation is not necessary to be used to mitigate the problem. Instead, a noise-dodging algorithm may be used to delay transmissions during the noisy period.

Several considerations when calculating an appropriate fragmentation size include the current fragmentation size, as the new fragmentation size should be less than the current frame size. However, the IEEE 802.11 standard specifies a minimal fragmentation size (256 bytes), and thus any proposed fragmentation size should be no less than this size.

A minimum fragmentation size for expected throughput is also a consideration, as there are additional costs (e.g., overhead) in PHY and MAC layer for each 802.11 MPDU packet (fragmentation) transmission. Without fragmentation, each MSDU needs the following media occupation time cost (without considering back-off due to collision):

DIFS=1*SIFS+2*Slot Time (aDIFSTime)

Average back off time (aBackOffTime)

MAC header and checksum (aMACTime)
Preamble, tail and PHY header (aPHYTime)
Time for receiver's ACK frame (aACKTime)
SIFS intervals for ACK frames (aSIFSTime)
Thus, for a MSDU, the cost is:

aMSDUTime=a*DIFS*Time+*a*BackOffTime+aMac-Time+aPHYTime+a*ACK*Time+a*SIFS*Time

With fragmentation, for each additional MPDU other than the first MPDU, the following comprise the extra cost (media occupation time) needed:
MAC header and checksum for MPDU (aMACTime)
Preamble, tail and PHY header (aPHYTime)
Time for receiver's ACK frame (aACKTime)
2 SIFS intervals for MPDU and ACK frames (2*aSIFSTime)
Thus, one MPDU cost is:

aMPDUTime=aMACTime+aPHYTime+a*ACK*Time+2*a*SIFS*Time

Also, the time for transmission MSDU payload data (MSDUDataSize) at a certain data transmission rate (Do) is:

DataTime=MSDUDataSize/Do

The more the number fragmentations a MSDU contains, the more channel time the MSDU needs to occupy. The following formula calculates the minimum time needed for MSDU with N (>1) fragments:

aFragmentedMSDUTime=aMSDUTime+(*N*−1)*aMPDUTime+DataTime

For a wireless connection operating on a certain data rate (Do in Mbps), in order to achieve a certain data transmission rate requirement (Dr in Mbps), the minimum fragmentation size needs to satisfy the following:

$$FragmentSize >= \left\lceil \frac{MSDUDataSize * aMPDUTime}{MSDUDataSize * \left(\frac{1}{Dr} - \frac{1}{Do}\right) - aMSDUTime + aMPDUTime} \right\rceil$$

By way of example, consider an IEEE 802.11a connection operating on 54 Mbps rate, with an MSDU data size of 2312 bytes. To calculate the minimum fragmentation size for an expected data rate of 24 Mbps (assume CWmin=7), with the IEEE 802.11 standard, the following input data is present:

aMSDUTime=107.5 micro second aMPDUTime=58 micro second

From the above formula, the minimum fragmentation size is 355 bytes.

In order to quickly mitigate the channel noise effect, the fragmentation mitigation should choose the fragmentation size as follows:

New Fragment Size=MAX(Minimum Fragmentation Size, Minimum Fragmentation Size for Expected Throughput).

In the event that the calculated fragmentation size is not less than the current fragmentation size, then no further fragmentation can be done. In this case, other mitigation solutions are considered to provide good wireless throughput. More particularly, the system may continue monitoring the packet transmission situation and error rates as described above. If the fragmentation mitigation does not resolve the problem as expected, then the system should consider other mitigation solutions.

Another mitigation solution includes instantaneous frequency selection, in which mitigation control information is exchanged nodes via coordinated-action between wireless nodes. For example, the control information may be exchanged via 802.11 management frames at the highest priority. Note that prior to the instantaneous frequency selection, a decision making component (e.g., including the interferer decision module 360) has already decided that instantaneous frequency selection action is to be taken.

Instantaneous frequency selection operates by selecting a new channel, and also may change the transmission power level. For example, channel selection may be performed by the access point or by a network management entity. In general, any candidate channel will be one that (likely) provides significantly better bandwidth than the current channel. The selection process will calculate the amount of sustainable bandwidth $B_p$ that can be potentially achieved. Also, the selection process needs to be 802.11 compliant, including 802.11d and 802.11h.

If the interference is from other communication devices, including WLAN devices, already operating in the new channel, the BSS may have to share bandwidth. If the interference is only a noise signal, such as interference from microwave oven, a higher transmission power level can be used to increase the SNR (Signal/Noise Ratio) level to achieve high bandwidth. In such a situation, various criteria needs to be taken into account when calculating the potential bandwidth $B_p$, including the strength of the noise, the maximum transmission power levels of the devices in the BSS, the receiver sensitivity of the devices in the BSS, and the (maximum) loss for the signal traversing from the stations to the access point.

In one example implementation, instantaneous frequency selection is initiated by the access point through an IFS-NOTIFY message. The IFS-NOTIFY message contains the following information:

| Information | Notes |
| --- | --- |
| Timestamp | The timestamp when the IFS-NOTIFY message is transmitted. Its value comes from the same timer used in beacon and probe response (described below). |
| NewChannel | For 802.11b/g, this field contains the number for the new channel. For 802.11a, this field contains the new center frequency. |
| TargetSwitchTime | The time when the channel switch is expected to happen. The value comes from the same timer used in beacon and probe response. |

IFS-NOTIFY message will be broadcasted N times at an interval I, where N and I are configurable parameters. Confirmation from stations is not needed in one implementation. Also, different transmission rates may be used, as described below, with multiple retransmissions at each rate; the number of transmissions N need not be the same for each rate.

The IFS-NOTIFY message can be transmitted as a high-priority 802.11 packet through the serving WLAN channel (or a different and/or dedicated channel in an alternate configuration). The IFS-NOTIFY message should be transmitted at the highest PHY rate (least probability of collision) and the lowest PHY rate (the best SNR or most noise tolerance). To facilitate reception, this message may sent in various ways, e.g., by repeating the message transmission at a high rate some number (e.g., ten) of times; then by switching to low rate and transmitting some number (e.g., ten) of times. Note that noise immunity is better at low transmissions speeds (as represented in FIG. 4), whereas air occupancy, and hence probability of collision, is low at high speeds; by transmitting in these varied ways, the chance of receiving at least one IFS-NOTIFY message is improved.

When IFS-NOTIFY message is broadcast and received at the other nodes (stations), the stations prepare the PHY layer to switch into the new channel at a TargetSwitchTime. For example, the maximum time for channel switching may need to be less than 100 milliseconds.

After the access point completes the channel switch, the access point sends a beacon packet in the new channel as soon as possible (the exact time may not be pre-determined, since the access point needs to compete with other WLAN devices for medium access). Subsequent beacons are sent at each beacon interval. Because the same timer is used for TargetSwitchTime and Beacon Timestamp, the stations do not have to wait for the first access point's beacon before they can send packets in the new channel.

Figure 5:
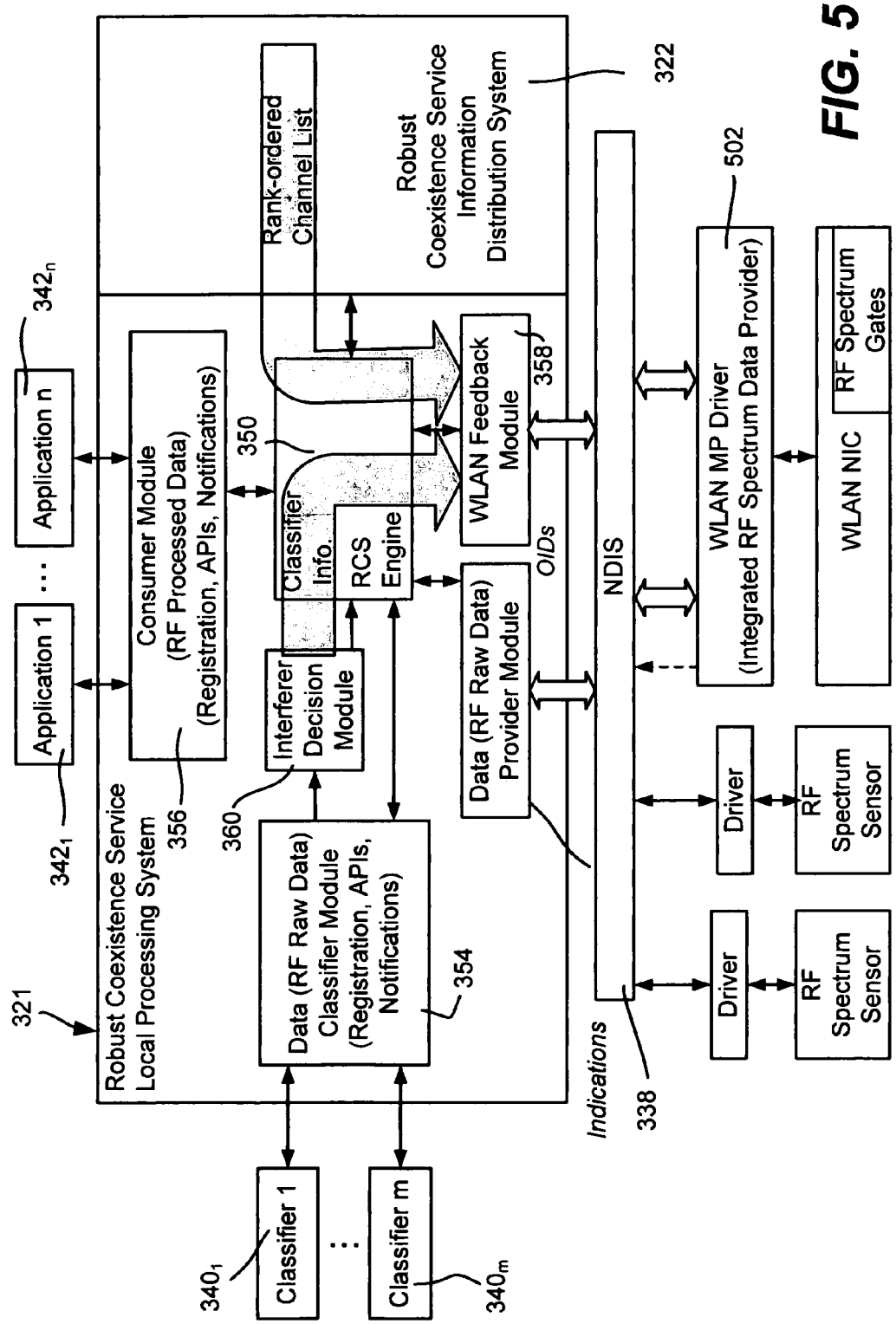
FIG. 5 is a block diagram generally representing components connected to example components of the robust coexistence service to mitigate interference-related problems in a wireless network.

As generally represented in FIG. 5, in addition to the robust coexistence service to miniport (MP) driver interface variables (Timestamp, ChannelNo, Strength, CenterFreq, Bandwidth, ClassifiedEvent and DutyCycle, shown as "Classifier Info." in FIG. 5), a peer processor rank-orders the channels according to a channel quality metric. The information distribution system 322 provides a list that the WLAN MP driver 502 can choose to use. Alternatively, the WLAN MP driver 502 can use its own algorithm based on the classifier information provided.

With respect to the channel quality metric (CQM), channels are assigned a rating based on the following list:
  Channel with a non-hopper interferer=Max (=10 for example)
  Channel with a "time" hopping interferer (including other BSSs)=10*DutyCycle
  Channel with a frequency hopping interferer=5*K1 where K1=probability of being on the serving channel
  Channel with no classified interferer=0
  Last serving channel=past weight that decays over time.

Figure 6:
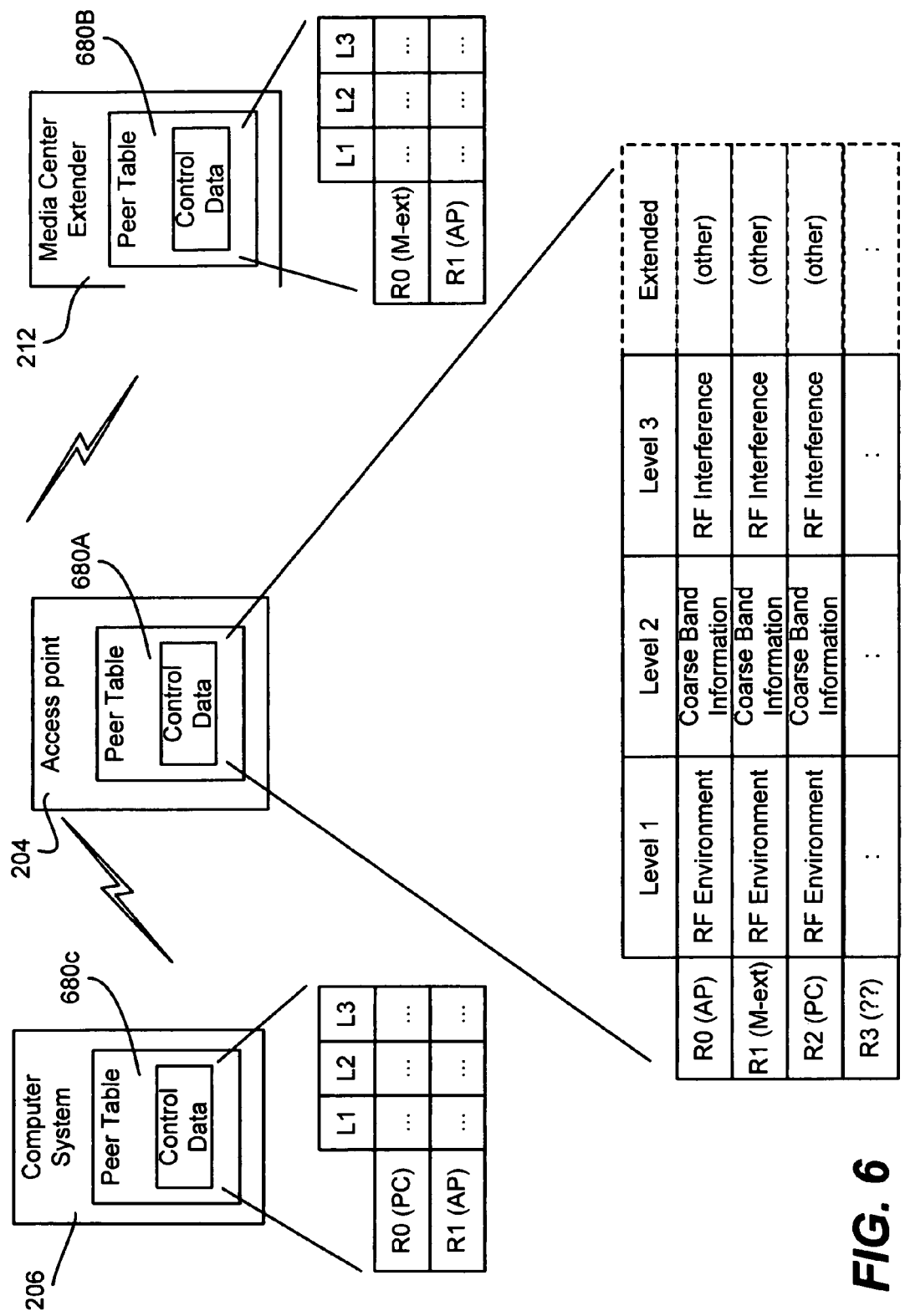
FIG. 6 is a block diagram generally representing how control data may be formatted according to the cooperative protocol is arranged in peer tables.

In one implementation, a rank-ordered channel list is compiled for any wireless node, in which the robust coexistence service running on that node maintains a peer table having at least two rows, with row 0 containing information about its own wireless environment, and row 1 containing information about its one-hop peer's wireless environment. Such peer tables are represented in FIG. 6 by peer tables 680A, 680B and 680C, corresponding to nodes 204, 206 and 212, respectively.

Considering Channel 1, from the non-row zero entry in the Peer Table, a number is assigned based on the CQM above, $CQM_{R1}$, with reported noise strength $N_{R1}$ (in dBm) added to obtain:

$R1 = CQM_{R1} + [N_{R1} + k]$

The constant, k=Chipset Noise Floor (as described above), is so chosen that the noise power parameter, $[N_{()1}+k]$ is non-negative. This procedure is repeated for any channels of interest. Note that a similar weighting based on Row 0 is not necessary if ACKs are ignored; the current node has the Short-try limit=0 and No Fragmentation conditions set when transmitting and there is an interferer in the serving channel.

If there is no information about the channel for the Rx node, a rating of "X" is assigned and listed as the last entry. The channel with the lowest overall rating, $R_a$, is the first entry of the list, and the one with the highest total is the last entry. In the example below, the entries are ordered from left to right with "C" being the channel number and "R" being its rating:

| 2.4 and 5 GHz channels: | | | | |
|---|---|---|---|---|
| C1; R1 | C2; R2 | ... | Cn; Rn | Cp; X |

At the current wireless node, the channel in the leftmost cell is the best one on which to transmit. The MP driver 502 can use this channel information and augment it with other considerations, such as orthogonality of 802.11 channels, and military blocking in 802.11(h). Thus, for example, a channel that is not best (e.g., as indicated by its presence in the leftmost cell) may be chosen because it is further from the current channel, because of military blocking, and/or any other considerations, such as known historical patterns.

Figure 7:
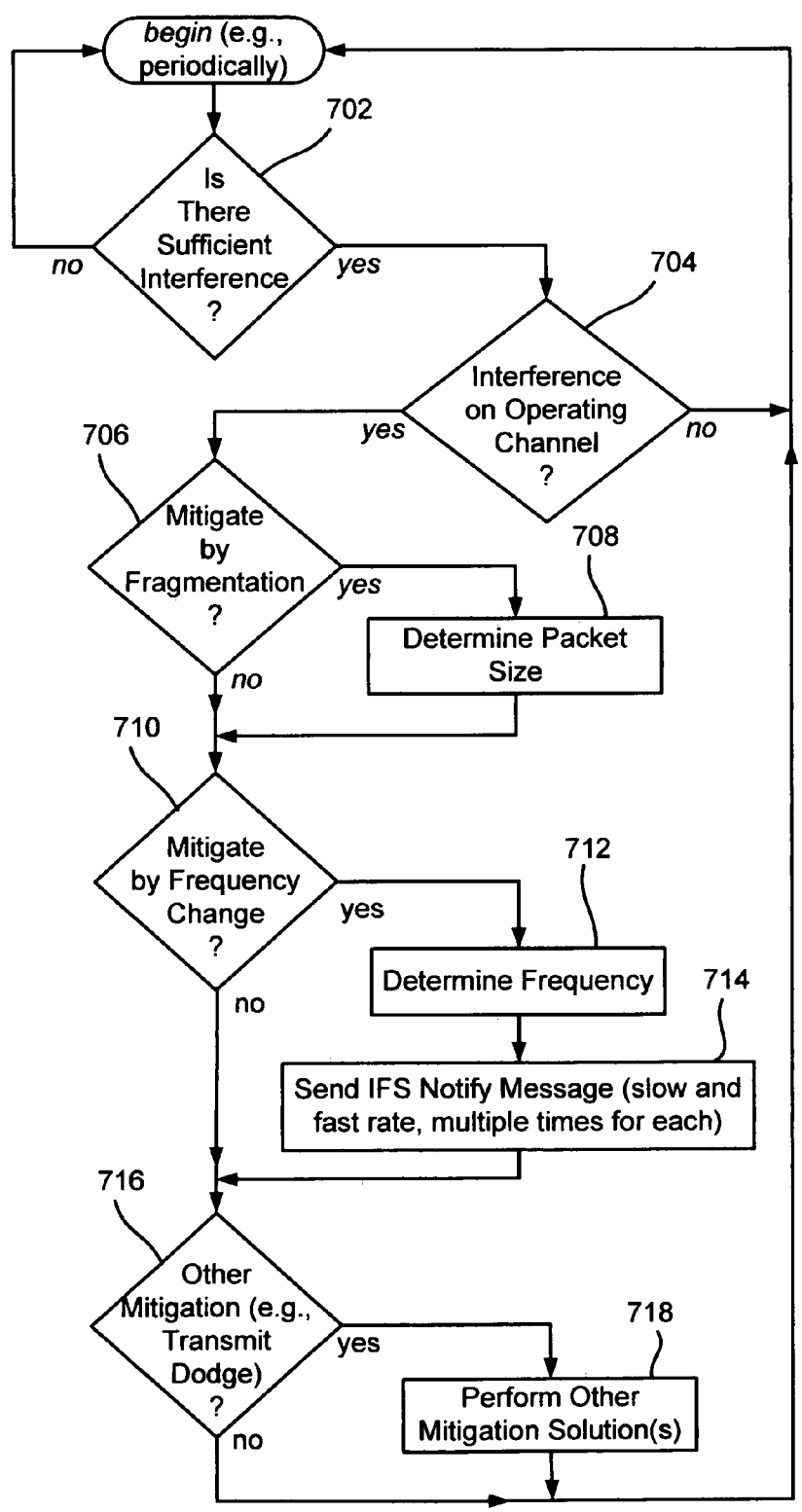
FIG. 7 is a flow diagram showing general example operations that may be taken to mitigate interference-related problems in a wireless network.

FIG. 7 summarizes the operations, beginning at step 702 where the sensed amount of interference is evaluated against the noise floor, such as on a periodic basis. If not sufficient to warrant mitigation, the process returns until the next time period. Note that an event or the like can also trigger the process. Further note that FIG. 7 is only an example flow diagram referencing some mitigation solutions, and that one or more other mitigation solutions are possible; solutions may be considered in a different priority order than the order represented in FIG. 7. Also, although not shown in FIG. 7, one mitigation solution may exclude one or more other solutions, e.g., do not consider transmit dodge if mitigation by frequency change is selected as the solution.

If sufficient noise exists at step 702, step 704 represents determining whether the noise is sensed on the current channel. If not, there is no need to mitigate, and the process returns until the next time period. Note that steps 702 and 704 may be combined into a single operation performed by the interferer decision module 360, or may be separate to reduce the module's complexity and thereby make the noise floor evaluation, which may be performed continuously or near-continuously, highly efficient.

In the event that a sufficient amount of noise exists on the current channel to attempt mitigation, step 706 represents determining whether fragmentation is a suitable mitigation solution. If so, step 708 is executed to determine a smaller packet size. Note that the fragmentation mitigation change is performed by the sender, which may not be the same node that is detecting interference and providing corresponding interference data.

Further, note that a packet size can be determined using the computations described above, however it is also feasible to adaptively decrease the packet size more and more (or iterate) until a good (or best) size is found or the minimum is reached, and/or likewise increase the packet size toward a maximum until the good (or best) size is found. Increasing slowly is one way to return the packet size when the interference goes away, although a packet size reset following the "no" branch of step 702 and the "no" branch of step 704 may also be performed. The step-down or step-up need not be the same, e.g., one direction may step linearly, while the other may step exponentially or based on some other function.

Frequency mitigation is also evaluated at step 710. Frequency mitigation may not occur when it is unlikely to help, and/or if fragmentation changes the packet size at step 708. If frequency mitigation is employed, step 712 is executed to determine the new frequency as described above, and step 714 sends the instantaneous frequency message to other nodes, some number x (e.g., ten) times at a fast rate, and some number y (e.g., also ten) times at a slow rate, although x and y need not be equal.

Again, note that FIG. 7 is only an example, and does not limit the types of mitigation solutions, and/or any priority order of mitigation actions. For example, depending on the type and/or pattern (e.g., duty cycle) of interference, timing consequences of each of these actions may determine a more efficient priority order.

Other mitigation solutions may be considered and/or performed, such as transmit dodge, power adjustments and so forth, as represented at steps 716 and 718. The process then jumps back to begin again.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer storage medium having computer-executable instructions, which when executed by a processor of a computer system perform steps for determining whether interference has achieved a threshold level in a wireless network, wherein the wireless network comprises a serving basic service set (BSS) that includes a first device for receiving wireless signals, and a second device for transmitting wireless signals, the steps comprising:

receiving classified data from one or more classifiers, the classified data describing interference that is detectable within the wireless network;

determining, by the processor, whether the interference is being generated by a non-WLAN interferer or by a WLAN interferer that is part of a different BSS operating in the same channel;

if it is determined that the interferer is a non-WLAN interferer, performing the following:

the processor generating a noise floor for the first device by subtracting a required signal to noise ratio at each data rate from a receive sensitivity of the first device at the corresponding data rate; and comparing the interference level to the noise floor such that if the interference level is below the noise floor, the interference is ignored, otherwise the interference is addressed;

if it is determined that the interferer is a WLAN interferer that is part of a different BSS, performing the following:

the processor sending a command to each wireless node in the serving BSS, the command causing each wireless node to cease transmitting;

the processor sending a command to a sniffer to cause the sniffer to sniff the channel to detect the presence of the WLAN interferer;

the processor receiving a radio signal strength indicator (RSSI) from the different BSS that includes the WLAN interferer;

comparing the RSSI of the different BSS to the RSSI of the serving BSS such that if the RSSI of the different BSS is a threshold level below the RSSI of the serving BSS, the interference is ignored, otherwise the interference is addressed;

addressing the interference by performing one of fragmenting packets of a signal transmitted from the second device to the first device, or by performing instantaneous frequency selection.

2. The at least one computer storage medium of claim 1 wherein prior to comparing the RSSI of the different BSS to the RSSI of the serving BSS, the RSSI of the different BSS and the RSSI of the serving BSS are averaged over a specified time to generate average values for each RSSI that are used for the comparison.

3. The at least one computer storage medium of claim 1 wherein the threshold level is 20 dB.

4. The at least one computer storage medium of claim 1 wherein the interference is addressed by performing fragmenting and wherein fragmenting comprises:

determining a minimum fragmentation size that may be used to achieve a minimum transmission rate;

determining whether the minimum fragmentation size is lower than a current fragmentation size, and if so, commencing to send packets that are fragmented at the minimum fragmentation size.

5. The at least one computer storage medium of claim 1 wherein instantaneous frequency selection is performed by:

sending a message to the first device that indicates a new channel and a switch time, the message causing the first device to commence receiving data on the new channel at the switch time.

6. The at least one computer storage medium of claim 5 wherein the message is sent as a high priority 802.11 packet through the channel.

7. The at least one computer storage medium of claim 5 wherein the message is sent at both the highest and lowest physical rates.

8. The at least one computer storage medium of claim 5 wherein the new channel is selected from a list of channels based on the potential bandwidth provided by each channel.

9. A method performed by a processor of a computing device in a wireless network for determining whether interference has achieved a threshold level in the wireless network, wherein the wireless network comprises a serving basic service set (BSS) that includes a first device for receiving wireless signals, and a second device for transmitting wireless signals, the steps comprising:

receiving classified data from one or more classifiers, the classified data describing interference that is detectable within the wireless network;

determining, by the processor, whether the interference is being generated by a non-WLAN interferer or by a WLAN interferer that is part of a different BSS operating in the same channel;

if it is determined that the interferer is a non-WLAN interferer, performing the following:

the processor generating a noise floor for the first device by subtracting a required signal to noise ratio at each data rate from a receive sensitivity of the first device at the corresponding data rate; and comparing the interference level to the noise floor such that if the interference level is below the noise floor, the interference is ignored, otherwise the interference is addressed;

if it is determined that the interferer is a WLAN interferer that is part of a different BSS, performing the following:

the processor sending a command to each wireless node in the serving BSS, the command causing each wireless node to cease transmitting;

the processor sending a command to a sniffer to cause the sniffer to sniff the channel to detect the presence of the WLAN interferer;

the processor receiving a radio signal strength indicator (RSSI) from the different BSS that includes the WLAN interferer;

comparing the RSSI of the different BSS to the RSSI of the serving BSS such that if the RSSI of the different BSS is a threshold level below the RSSI of the serving BSS, the interference is ignored, otherwise the interference is addressed;

addressing the interference by performing one of fragmenting packets of a signal transmitted from the second device to the first device, or by performing instantaneous frequency selection.

10. The method of claim 9 wherein prior to comparing the RSSI of the different BSS to the RSSI of the serving BSS, the RSSI of the different BSS and the RSSI of the serving BSS are averaged over a specified time to generate average values for each RSSI that are used for the comparison.

11. The method of claim 9 wherein the threshold level is 20 dB.

12. The method of claim 9 wherein the interference is addressed by performing fragmenting and wherein fragmenting comprises:

determining a minimum fragmentation size that may be used to achieve a minimum transmission rate;

determining whether the minimum fragmentation size is lower than a current fragmentation size, and if so, commencing to send packets that are fragmented at the minimum fragmentation size.

13. The method of claim 12 further comprising detecting that the interference comprises a periodic signal having a short period, and in response, performing the fragmentation.

14. The method of claim 12 wherein it is determined that the minimum fragmentation size is not lower than the current fragmentation size and in response, performing instantaneous frequency selection.

15. The method of claim 9 wherein instantaneous frequency selection is performed by:

sending a message to the first device that indicates a timestamp, a new channel, and a switch time, wherein the timestamp indicates the time when the message is transmitted, the message causing the first device to commence receiving data on the new channel at the switch time.

16. The method of claim 15 wherein the message is sent as a high priority 802.11 packet through the channel.

17. The method of claim 15 wherein the message is sent at both the highest and lowest physical rates.

18. The method of claim 15 wherein the new channel is selected from a list of channels based on the potential bandwidth provided by each channel.

19. The method of claim 15 wherein the first device switches to the new channel within 100 milliseconds of the message being transmitted.

* * * * *